3,038,904
METHOD FOR SEPARATING AMINES
Norman B. Godfrey, Austin, Tex., assignor to Jefferson Chemical Company, Inc., Houston, Tex., a corporation of Delaware
No Drawing. Filed Sept. 23, 1959, Ser. No. 841,685
5 Claims. (Cl. 260—268)

The present invention relates to a method for separating amines and, in particular, to a method for separating mixtures of amines into fractions from which individual components may be more readily recovered by ordinary means of separation.

The term "amines" encompasses a broad class of compounds which may be said to be derivatives of ammonia in which one or more of the hydrogen atoms in ammonia has been replaced by an organic radical. Polyamines are compounds having two or more amine groups on an organic radical or joining organic radicals.

The polyamines are well known materials and are widely employed as curing agents for resins, gas scrubbing agents and as intermediates in the manufacture of emulsifiers, corrosion inhibitors and the like. Certain of the polyamines are also employed as intermediates in the manufacture of pharmaceuticals. The growing number of uses for these materials has increased their value and has resulted in efforts to provide more economical methods for their production and recovery.

Polyamines may be prepared in a catalytic amination reaction from aminoalcohols and glycols. An example of this is the reaction of monoethanolamine with ammonia in the presence of hydrogen and a hydrogenation catalyst at an elevated temperature and pressure. This reaction will result in the production of substantial quantities of piperazine and ethylenediamine in an aqueous solution admixed with lesser amounts of by-products, such as N-methylpiperazine, N-ethylpiperazine, N-methylethylenediamine, N-ethylethylenediamine, diethylenetriamine, aminoethylpiperazine, aminoethylethanolamine and 1-piperazineethanol. A typical low-boiling fraction (100°–117° C.) of the foregoing reaction product will contain ethylenediamine, N-methylethylenediamine, N-ethylethylenediamine, N-methylpiperazine and N-ethylpiperazine. A typical high-boiling fraction (207°–242° C.) will contain diethylenetriamine, aminoethylpiperazine, aminoethylethanolamine and 1-piperazineethanol.

Polyamine by-products are valuable particularly when they are obtained in an essentially pure condition. However, recovery of the individual amine by-products from an aqueous mixture, such as the above, is extremely difficult and costly by conventional methods because some of the by-product amines have very close boiling points while others form close-boiling azeotropes. Mixtures of polyamines, in general, have been found difficult to resolve for the same reasons and the usefulness of polyamine mixtures has been severely handicapped by the lack of more effective processes for their separation.

A method has now been discovered for effectively separating mixtures of polyamines. According to this method, a mixture of polyamines comprising a first polyamine of a class having primary and/or secondary amine groups in which said primary and/or secondary amine groups are connected by a single chain of not more than three carbon atoms and a second polyamine of a class outside the class of said first defined polyamine, may be separated into the respective polyamine classes by contacting the mixture with certain metal salts resulting in the formation of metal complexes. While polyamines, in general, are known to form metal complexes, this method is effective due to the different responses to the formation of complexes exhibited by the two classes of polyamines described above. Polyamines in the first class apparently are either more active complexing agents or produce more stable metal complexes with the result that the properties of these materials are effectively altered in a stable metal complex in contrast to the properties of the second class of polyamines, thereby providing a way for separating the polyamine mixture into the two classes of polyamines. This method for separating mixtures of polyamines when employed in conjunction with well known methods of separation provides a flexible and valuable procedure for resolving a wide variety of polyamine mixtures.

In accordance with this invention, a mixture comprising polyamines in which there is a first polyamine, of a class having primary and/or secondary amine groups in which the amine groups are connected by a single chain of not more than three carbon atoms, and a second polyamine, outside the class of said first defined polyamine, is treated with a metal salt effective for the formation of metal complexes. This mixture is thoroughly agitated and, if desired, moderately heated to facilitate the formation of the metal complexes. Polyamines of the first noted class are substantially changed with respect to their original properties on the formation of relatively stable metal complexes with the result that the stable complexes produced from the first class of polyamines may be readily separated from the second class of polyamines.

This process is effective for the separation of a wide range of polyamine mixtures. The only limitation with respect to its application is that the polyamine mixture comprise at least one member of each class of polyamines referred to above in order to be effective. The process may be employed to separate mixtures of polyamines consisting of a number of individual polyamine compounds or it may be employed with equal effectiveness to separate a two-component polyamine mixture.

Polyamine mixtures which have been effectively resolved by means of this process include a mixture containing substantial quantities of ethylenediamine, N-methylpiperazine, N-ethylpiperazine, N-methylethylenediamine and N-ethylethylenediamine. Close-boiling binary mixtures of polyamines have also been successfully separated such as the mixture consisting of aminoethylethanolamine and 1-piperazineethanol. This process is particularly valuable for separating mixtures of alkylenediamines and dialkylenediamines characterized by having members of the two classes of polyamines described above. For example, a mixture comprising ethylenediamine and/or its N-alkyl-, N-hydroxyalkyl- and N-aminoalkyl-derivatives together with piperazine and/or its N-alkyl-, and N-hydroxyalkyl-derivatives may be effectively separated in the manner described above.

The separation of polyamine mixtures by this method is generally conveniently conducted in an aqueous solution of the polyamines. However, a broad range of solvents may be effectively employed either as the sole solvent medium or in conjunction with an aqueous medium. Solvents suitable for such purposes include aromatic hydrocarbons, such as benzene, xylene, and toluene, the lower aliphatic alcohols, such as butanol, hexanol, ethanol and the like, and the monoalkyl and dialkyl ethers of alkylene glycols.

The formation of the metal complexes is brought about by treating a solution of the complexing agents, i.e. polyamines, with a solution of an effective metal salt. The preferred metals for this purpose include copper, nickel, cobalt and zinc although other metals, such as palladium, platinum and cadmium may also be employed. The foregoing metals are generally employed as salts having substantial solubility in the polyamine solution. For most purposes, the preferred metal salts are nitrates, sulfates, chlorides, bromides, acetates, hydroxide and carbonates.

While the amount of the metal salt employed is not considered critical so long as there is a sufficient amount of the metal ions present to form the desired complexes, the differences in properties in the complexes formed may be accentuated if a limited amount of the metal salt is introduced into the polyamine mixture undergoing treatment. By a limited amount is meant an amount less than the theoretical amount required to combine with all of the polyamines in the mixture. A preferred amount is an amount 10-50% in excess of the theoretical amount required to form complexes with the first class of polyamines. In such a procedure, a substantial proportion of the metal salt will ultimately be found in the more stable metal complexes derived from the polyamine or polyamines of the first class noted above. The ratio of metal ion to polyamine generally present in the complex is in the range of 0.5:1 to about 1:1 depending on the particular materials in question.

The properties of the stable metal complexes formed from polyamines having primary and/or secondary amine groups will be substantially altered as compared to the properties of the polyamines themselves. In some cases the complexes will be insoluble in the solvent medium and precipitate out. Alternatively, the boiling points of the metal complexes may be substantially altered so that they can be readily separated from the other polyamines by distillation. In many cases, the solubility of the stable metal complexes is greatly modified so that a solvent extraction procedure will be effective for separating the stable complexes from the polyamine not forming stable complexes.

The stable complexes separated by the process may be readily decomposed to regenerate the complexing agent or polyamine. For example, a strong mineral acid may be added to the complexes to form a mixture of polyamine salts and metallic salts. These may be separated by fractional crystallization or extraction with a suitable solvent. Alternatively, the complexes may be steam distilled in the presence of a strong base, such as sodium hydroxide, effecting distillation of the regenerated polyamines.

The following examples illustrate the practice of this invention. Where the quantity is expressed in parts, parts by weight is intended.

Example I

To 12.8 parts of an overhead fraction obtained in the manufacture of piperazine from monoethanolamine consisting of water, ethylenediamine, N-methylethylenediamine, N-ethylethylenediamine, N-methylpiperazine and N-ethylpiperazine was added 1.6 parts of cupric chloride dihydrate. These materials were intimately admixed to effect the formation of the copper complexes. The reaction product containing the complex compounds was then extracted continuously for three and a half hours with chloroform. The extract was analyzed by vapor phase chromatography and found to contain the N-methylpiperazine and N-ethylpiperazine. No ethylenediamines were found in the extract indicating that a complete separation was effected between the ethylenediamine and the piperazine components.

Example II

To 13 parts of an overhead amine fraction having a composition similar to that described in Example I above was added 1.5 parts of zinc chloride. These materials were intimately admixed to effect formation of the zinc complexes. This reaction product containing the zinc complex compounds was then extracted with chloroform. The extract was analyzed by vapor phase chromatography and found to contain N-methylpiperazine and N-ethylpiperazine. No ethylenediamines were found in the extract indicating that the separation was complete.

Example III 219 grams of an aqueous amine fraction containing 55% ethylenediamine, 20.7% N-methylethylenediamine, 7.4% N-ethylethylenediamine, 14% N-methylpiperazine and 3.3% N-ethylpiperazine was mixed with 225 ml. of butanol. This mixture was cooled in water while 102 grams of nickel chloride hexahydrate was intimately admixed therewith. The amount of nickel chloride hexahydrate added corresponded to 1 mol of nickel chloride for every 3 mols of the ethylenediamine compounds. The reaction product with the nickel chelates was permitted to settle with the resultant formation of two phases. The upper phase, which weighed 205.6 grams, was separated. On analysis, this phase was found to contain 0.243 equivalents of mixed N-methylpiperazine and N-ethylpiperazine, or 97% of the piperazine content originally present. Pure N-methylpiperazine, boiling at 138° C. was separated from this by azeotropic distillation with added water to remove the butanol, followed by a simple fractional distillation.

Example IV 515 grams of an aqueous amine mixture having the same composition of the amine mixture described in Example III above was admixed with 256 grams of nickel sulfate hexahydrate. After intimate mixing, a finely divided precipitate of ethylenediamine-nickel complex salts was formed. This precipitate was filtered out and washed to yield 216 grams. A mixture of N-methylpiperazine and N-ethylpiperazine, which remained dissolved in the filtrate, was removed by steam distillation.

The precipitate which consisted of the nickel-ethylenediamine chelates was mixed with a 20% aqueous solution of sodium hydroxide and subjected to steam distillation. On analysis the products were found to be ethylenediamine, N-methylethylenediamine and N-ethylethylenediamine indicating complete separation from the N-alkyl-piperazines.

Example V

One part of piperazineethanol and one part of 2-(2-aminoethylamino) ethanol were admixed with three parts of xylene. The mixture was made homogeneous by heating to about 80° C. A methanol solution of anhydrous cupric chloride containing the theoretical amount of cupric chloride to form the complex

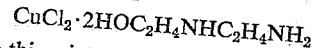

was added to this mixture. The mixture was then agitated at an elevated temperature until substantially all of the methanol had distilled off at which time the mixture was allowed to cool to 70° C. and then filtered. On further cooling the filtrate separated into two layers which were separated. The lower layer consisted of 1-piperazineethanol and a minor amount of xylene but no 2-(2-aminoethylamino)ethanol. The precipitate obtained above was washed with benzene and air-dried to give a quantitative yield of the complex $CuCl_2 \cdot 2HOC_2H_4NHC_2H_4NH_2$ indicating that the separation was complete.

Example VI

A mixture of 60 parts each of aminoethylpiperazine and diethylenetriamine was dissolved in 144 parts dimethyl ether of ethylene glycol. To this solution was added with stirring a solution of 41 parts anhydrous cobaltous chloride in 116 parts of methanol. The cooled mixture was filtered, yielding 104 parts of solid cobalt chloride-diethylenetriamine complex. Fractional distillation of the filtrate gave aminoethylpiperazine boiling at 62°-64° C. (1 mm.), but no diethylenetriamine.

Obviously, many modifications and variations of the invention, as hereinbefore set forth, may be made without departing from the spirit and scope thereof, and therefore only such limitations should be imposed as are indicated in the appended claims.

I claim:

1. A process for separating a mixture of amines comprising:

(a) A first alkylene open chain polyamine characterized by having amine groups selected from the class consisting of primary and secondary amine groups, each of said chains containing not more than three carbon atoms, and (b) A piperazine compound substituted on one of the nitrogen atoms with a substituent group selected from the group consisting of methyl, ethyl, hydroxyethyl and aminoethyl, (c) Said method comprising the steps of:

(d) Adding to said mixture of amines a salt selected from the group consisting of sulfates and chlorides of copper, nickel, cobalt and zinc to thereby form a stable metal complex of said material selected from the first polyamine, and (e) Separating said stable metal complex from said mixture to thereby effect said separation.

2. A process for separating a mixture of:

(a) A first open chain aliphatic polyamine comprising a member selected from:

(b) A first class consisting of ethylenediamine, diethylene triamine, N-methylethylenediamine, N-hydroxyethylenediamine and N-ethylenediamine, and (c) A second amine comprising a member selected from a second class consisting of N-methylpiperazine, N-ethylpiperazine, N-hydroxyethylpiperazine and N-aminoethylpiperazine;

(d) Said process comprising the steps of:

(e) Adding to said mixture of amines a salt selected from the group consisting of sulfates and chlorides of copper, nickel, cobalt and zinc to thereby form a stable metal complex of said material selected from the first polyamine;

(f) The ratio of metal ion to polyamine being within the range of about 0.5:1 to about 1:1, and (g) Separating said stable metal complex from said semixture to thereby effect a separation of said selected member of said first class of amines from said second member of said second class of amines.

3. A method as in claim 2 wherein the metal salt is a chloride.

4. A method as in claim 2 wherein the chloride is cupric chloride.

5. A method as in claim 2 wherein the chloride is nickel chloride.

References Cited in the file of this patent

UNITED STATES PATENTS

| | | |
|---|---|---|
| 2,173,823 | Bersworth | Sept. 26, 1939 |
| 2,188,746 | Bersworth | Jan. 30, 1940 |
| 2,686,798 | Gmitter | Aug. 17, 1954 |

OTHER REFERENCES

Chemical Abstracts, vol. 53, pages 11085–11086 (1959).